United States Patent [19]

Mariaulle

[11] 3,968,971

[45] July 13, 1976

[54] FLUID-TIGHT PACKING

[75] Inventor: Claude Mariaulle, Le Palais-sur-Vienne, France

[73] Assignee: Automatisation - Sogemo, Saint-Junien, France

[22] Filed: Oct. 7, 1975

[21] Appl. No.: 620,395

Related U.S. Application Data

[63] Continuation of Ser. No. 469,850, May 14, 1974, abandoned.

[30] Foreign Application Priority Data

May 22, 1973 France .............................. 73.18504

[52] U.S. Cl. ............................. 277/177; 277/206 A; 137/625.69
[51] Int. Cl.² ....................... F16J 15/32; F16R 3/02
[58] Field of Search ........ 277/177, 176, 188, 206.1; 137/625.69

[56] References Cited
UNITED STATES PATENTS

| | | |
|---|---|---|
| 2,521,248 | 9/1950 | Parker .............................. 277/177 |
| 3,171,334 | 3/1965 | Rasmussen ...................... 277/188 X |
| 3,199,540 | 8/1965 | Forster ............................ 277/188 X |
| 3,253,617 | 5/1966 | Beckett .............................. 277/176 |

Primary Examiner—Samuel B. Rothberg
Attorney, Agent, or Firm—Larson, Taylor and Hinds

[57] ABSTRACT

A fluid-tight packing for relatively moving parts, for example, slide valve parts, comprises an active portion for disposition adjacent a first part of the moving parts with which it is in relative movement and a further or base portion fixed relatively to a second part of the moving parts, the active portion being articulated on the base portion so that when, in operation, the active portion tends to be moved in consequence of relative movement between the moving parts, it moves with respect to the base portion thereby enabling the zone of contact with the first of the moving parts to be changed and enabling lubrication to be re-established, the active portion being of substantially part-circular section and having its center located approximately at the point of articulation between the active and base portions.

7 Claims, 8 Drawing Figures

FLUID-TIGHT PACKING

This is a continuation, of application Ser. No. 469,850 filed May 14, 1974, now abandoned.

The invention relates to packings to be provided for ensuring fluid-tightness between two parts movable one with respect to the other, in particular for slide valves, for example pneumatic slide valves (which application is given solely by way of example).

It is known to use for this purpose toric packings of plastics or rubbery material which are carried by the fixed part or the movable part and which bear against these two parts, repectively.

This solution is not without disadvantages. In particular, in applications to mechanisms involving more or less prolonged stopping times, sticking phenomena may occur in the meantime where there is contact between each packing and the part in relative movement with respect thereto by reason of the temporary breaking of the lubricating film. The result of this, at the instant of starting, is, on the one hand, a supplementary operating effort at the same time as an increase in the time of response and, on the other hand, a destructive effect on the rubbery material of which the packing is formed. Double packings in which the elastic elements are disposed on both sides of a ring forming a central reinforcement have also been provided, but these packings do not enable the sticking phenomena to be remedied either.

The object of the invention is to remedy these disadvantages by a novel formation of the packing.

The invention consists in fluid-tight packing for relatively moving parts, especially relatively reciprocating parts, such as, for example, slide valve parts, comprising a movable or active portion for disposition adjacent a first part of the moving parts with which it is in relative movement and a further or base portion fixed relatively to a second part of the moving parts, the active portion being united with the base portion so as to be able to move relatively thereto in such a manner that when, in operation, said active portion tends to be moved in consequence of relative movement between the moving parts, it can move with respect to the base portion by articulating thereon, thereby enabling the zone of contact with the first part to be changed and, consequently, enabling normal lubrication to tend to be re-established, the said active portion being of substantial part-circular section and having its centre approximately at the location of articulation between the active portion and the base portion.

According to a preferred arrangement, the packing is constructed of two elements of rubbery material disposed on both sides of a reinforcement; one of these elements being in fixed contact with one of the parts in relative movement and the other, arranged as aforesaid, being in movable contact with the other part.

If, for example, cylindrical parts to be rendered fluid-tight one with respect to the other are concerned, as is the case, for instance, with a slide valve, the reinforcement is formed by a ring on both sides of which the aforesaid two elements are mounted. One of them, in fixed contact with the corresponding part, for example the cylinder, has a section in the form of a segment of a circle or the like, while the second element, intended to slide on the second part or slide, has a section of the same nature, but with two V-shaped notches, these notches therefore permitting, at least at the instant of starting, the relative rotation of the active end with respect to the base of the said second element, about the articulation opposite the bases of the notches.

Preferably, the circular segment of the active portion ensuring fluid-tightness has its centre disposed at the location of the aforesaid articulation.

Apart from these main arrangements, the invention consists of certain other arrangements which are preferably used at the same time and will be discussed more explicitly hereinafter.

It relates, more particularly, to certain modes of application (in particular that in which it is applied to packings for distributing or slide valves or similar piston devices), and to certain embodiments, of the said arrangements; and it relates, more particularly still and by way of new industrial products, to packings of the kind in question in which the application of these same arrangements is included, and also to the special elements suitable for the construction thereof and to assemblies, for example slide valves, comprising such packings.

And the invention can be clearly understood in any case with the aid of the following additional description and of the accompanying drawings, which additional description and drawings are, of course, given above all by way of example.

FIG. 1 of the drawings shows in section a slide valve, for example of the pneumatic type, to which the invention is applied;

Figure 8:
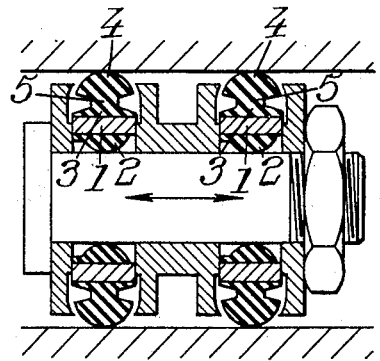

Finally, FIG. 8 illustrates a piston device equipped with packings according to the invention.

According to the invention, and more particularly according to those modes of application thereof and to those embodiments of its various parts to which it appears there is reason to give preference, there being available, for example, a machine or an apparatus in which fluid-tightness must be ensured by means of one or more plastics packings, and it being proposed to produce such a packing, this is set about as follows or in a similar manner.

Figure 1:
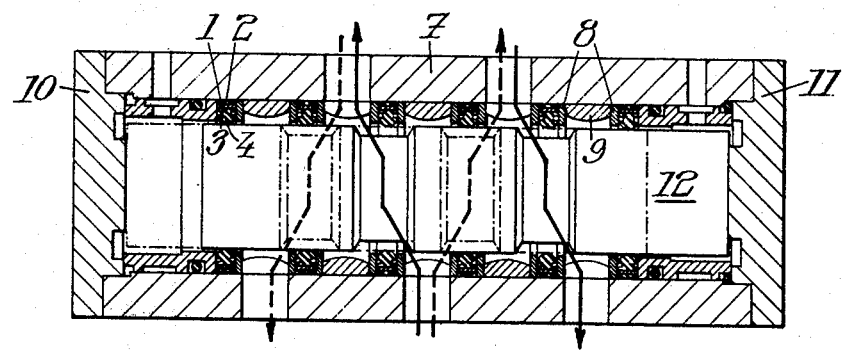

It is assumed in FIG. 1, solely in order to give a clear idea, that the problem is to ensure fluid-tightness between a distributing cylinder and its slide or slide valve.

Instead of being content with resorting to the most usual solution consisting in utilizing toric packings carried, for example, by the fixed part, in this case the cylinder, packings are used which are each arranged in such manner that, on the side in contact with the part in relative movement, for example the slide, an active portion of the packing in contact with the said slide can be carried along momentarily with the slide on starting, in particular after sticking, while articulating or hinging on a fixed base portion of the said packing.

In particular, in the embodiment illustrated, the assembly forming each packing is constituted by:

a central reinforcement 1 in the form of a ring, in particular a metal ring, a first rubber element 2 cemented to the said reinforcement, for example on the outside thereof, the said element being, for instance, semi-circular or the like, with its base cemented to the reinforcement, while the curved portion bears on the wall of the slide valve body, and a second element also cemented to the reinforcement, in this case on the inside thereof, this second element comprising, on the one hand, a base 3 cemented to the reinforcement and, on the other hand, a bead 4 of curved convex section connected to the base by a relatively slender portion 5 forming an articulation or hinge.

This articulation 5 is obtained, for example, by the presence of two lateral recesses 6 of V-shaped section, the angle A of the V being in particular of the order of 20° to 30° or more.

The bead 4, serving as an active element from the point of view of fluid-tightness, comprises in section a circular segment the centre of which is preferably situated at the location of the said articulation.

The mounting of packings of this kind inside the cylinder 7 of the slide valve is effected in any suitable manner. The various packings are positioned through the medium of rings 8 and moulded spacers 9, as shown in FIG. 1, in the application considered more particularly therein. The stacking of the various packings is obtained by the locking of end plates 10, 11.

It is understood that the slide valve shown in FIG. 1 is shown only by way of example and that the nature of its various component parts may be different from what is illustrated. The slide is shown at 12 in two different positions, one in solid lines and the other in chain-dotted lines. Arrows also show the flow of the air (or liquid) for the two positions, respectively, of the slide.

It is to be noted that the metal reinforcement 1 (made, for example, of brass) obviates all risks of crushing and dimensional variations of the rubber beads 2 and 3, 4 which could be caused by the lateral and axial squeezing strains varying according to the machine tolerances.

No deformation of the profiles need therefore be feared, the result of which is a constant driving pressure.

An assembly of this kind operates in the following manner.

Due to the possibility of rotation of the active portion 4 about the articulation 5, any strain or delay phenomenon on starting is avoided in the case of a prolonged stop having succeeded in causing a break in the oil film.

Figure 2:
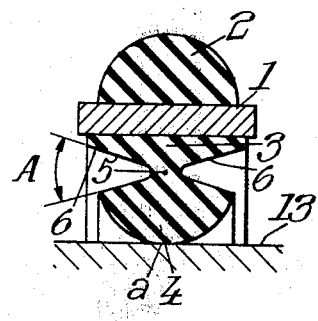
FIGS. 2 and 3 show in cross-section one of the packings to be provided in a slide valve of this kind, in two operative positions.
Figure 3:
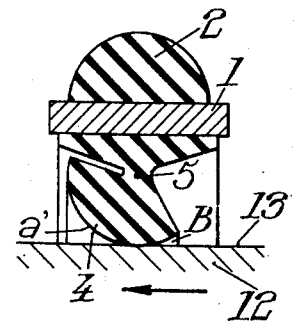

In fact, if it is assumed that, on starting, the line of contact between the active portion 4 and the entraining surface 13 of the piston 12 (FIG. 2) is established at $a$, this line is shifted, for example to $a'$ owing to the fact that the entraining effect exerted by the piston 12 causes the rotation of the active element 4 about the articulation 5, as can be seen in FIG. 3, that is to say causes a rolling movement.

In the course of this relative displacement, which is performed without any considerable supplementary effort, the oil present in the conveyed air is introduced progressively, in consequence of the rotation between the packing and the surface 13 of the slide 12, into the portion such as B in FIG. 3. There is therefore automatic restoration of the lubricating film before any sliding action.

Figure 6:
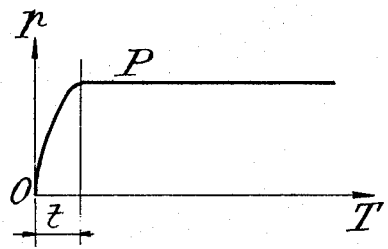
FIGS. 6 and 7 are diagrams respectively illustrating the functioning of a packing according to the invention and of a toric packing on starting.

Consequently, if a diagram of the driving pressure as a function of time is prepared, as shown in FIG. 6, it is found that the driving pressure increases normally from 0 to a maximum pressure, which is then maintained. There is therefore no overpressure or increase in the time of response by reason of momentary clinging between the rubber of the active portion 4 and the surface 13.

Figure 4:
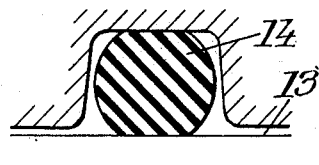
FIGS. 4 and 5 show similarly a toric packing device of conventional type.
Figure 5:
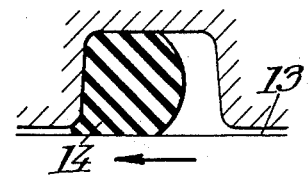

The position is quite different in a conventional system comprising toric packings, as shown by way of explanation in FIGS. 4 and 5.

In these drawings it can be seen that in the event of sticking the toric packing 14 is first deformed while maintaining the sticking between the packing and the entraining surface 13, as illustrated in FIG. 5.

Figure 7:
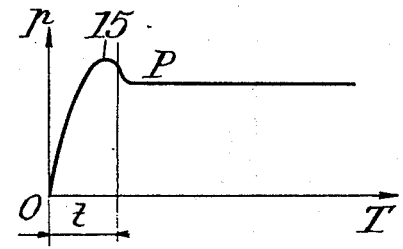

In order that separation may occur, it is necessary to produce a supplementary effort, which is manifested by a curve such as is shown in FIG. 7. It can be seen in this curve that the separation corresponds to a maximum pressure 15, which maximum then decreases to the dynamic driving pressure. This maximum pressure point 15 therefore corresponds on the one hand, to a momentary overpressure, that is to say to an increase in the force necessary to shift the slide or piston, and, on the other hand, to an increase in the time of response $t$.

It is these two disadvantages which are eliminated due to the invention, since according to this invention automatic restoration of the lubricating film is obtained not by sliding, but by rotation or rolling of the active portion 4 of the packing.

It is to be noted, moreover, that the bidirectional entrainment or carrying along of the active portion 4 by the slide according to the driving direction limits the possible wear of the packing. In other words, the central zone of the packing undergoes only little or no wear, the fluid-tightness being excellent and permanent when the slide valve remains under pressure and there is no action on the slide.

The advantages which have just been indicated in the special application to a slide valve would also show themselves in other applications.

It is to noted, moreover, that in the application generally speaking to pistons or slides it would also be possible to utilize the variant of FIG. 8, in which the packings are carried by the slide instead of the cylinder.

As a result of which, whatever the embodiment adopted, packings can be produced the operation of which is sufficiently apparent from the foregoing for it to be unnecessary to dwell on the subject thereof and which, in comparison with the packings in question already in existence, have many advantages, in particular:

suppression of any sliding in the zone of restoration of the lubricating film, due to the existence of the movement of rotation made possible during this period, consequently, reduction of the force necessary for eliminating the sticking phenomenon, in consequence, moreover, improvement of the time of response, and reduction of the wear of the packing.

Nitrile rubber, for example with a Shore hardness of 70°, will preferably be used for the packing, it being understood that any other material could be considered.

As is obvious and as is moreover already apparent from the foregoing, the invention is by no means limited to those modes of application and embodiments thereof which have been more particularly considered; on the contrary, it covers all variants, in particular that in which the packings would be mounted, not on cylindrical surfaces, but on plane surfaces or on any other forms of surface.

What is claimed is:

1. A fluid-tight packing for relatively moving parts, comprising:

a base portion fixedly connected to a first of said parts so as to be immovable relative thereto, an active portion united to the base portion at an articulated connection, said articulated connection forming a pivot point for turning movement of the active portion relative to the fixed base portion over a given angular distance to a limit angular position in the direction of relative movement of said parts, the surface of the active portion on the side thereof opposite its articulated connection with the base portion sealingly engaging the second of the relatively moving parts, said surface of the active portion being part-circular in its natural uncompressed state, as viewed transversely to the direction of relative movement of the parts, with the center of curvature of the part-circular surface being located at the location of the said articulated connection so that as the active part turns about its said center of curvature to change its zone of contact with the second part, thereby enabling normal lubrication to tend to be re-established, the said surface of the active part rolls in the circle of which it is a part, and wherein the said part-circular surface extends circumferentially a sufficient distance to remain in sealing contact with the second part when the active portion has turned to said limit angular position.

2. Packing according to claim 1, characterized by the fact that it is composed of two portions of resilient material disposed on respective opposite sides of a reinforcement, one of these portions being in fixed contact with the said first of the parts and the other including the active portion and being in movable contact with the said second of the parts.

3. Packing according to claim 2 for axially reciprocating cylindrical parts, characterised by the fact that the reinforcement is formed by a cylindrical ring to respective opposite sides of which the two portions of resilient material are cemented.

4. Packing according to claim 2, characterized by the fact that the said portion in fixed contact with the first part has the form of a bead, while the other portion includes lateral notches or the like dividing it into said active portion and said base portion articulated integrally one to the other.

5. Packing according to claim 1 characterized by the fact that the active portion is integral with the base portion and separated from the base portion by two opposed notches of V-shaped section, the articulation being between the notches.

6. Device comprising parts in relative movement, in particular slide valves, characterised by the fact that packings, constructed in accordance with claim 1, are carried by the fixed part of the device.

7. Device comprising parts in relative movement, in particular slide valves, characterised by the fact that packings, constructed in accordance with claim 1, are carried by the moving part, in particular the slide, of the device.

* * * * *